United States Patent [19]

Baumann

[11] 3,718,451
[45] Feb. 27, 1973

[54] METHOD OF MAKING FERTILIZER FROM CHICKEN MANURE

[76] Inventor: Heinz Baumann, 3 Zucherfabrikstr., Frankethal upper Palatinate, Germany

[22] Filed: July 7, 1971

[21] Appl. No.: 160,506

Related U.S. Application Data

[63] Continuation of Ser. No. 831,105, June 6, 1969, Abandoned

[52] U.S. Cl. ..............................71/9, 71/21, 71/28
[51] Int. Cl. ...............................................C05f 11/08
[58] Field of Search ..........71/1, 62, 64 G, 8, 9, 13 H, 71/21, 22, 28–30

[56] References Cited

UNITED STATES PATENTS

| | | | |
|---|---|---|---|
| 3,357,812 | 12/1967 | Snell | 71/9 |
| 3,655,395 | 4/1972 | Karnemaat | 71/28 |

FOREIGN PATENTS OR APPLICATIONS

| | | | |
|---|---|---|---|
| 897,067 | 5/1962 | Great Britain | 71/28 |
| 822,683 | 10/1959 | Great Britain | 71/9 |

*Primary Examiner*—Reuben Friedman
*Assistant Examiner*—Richard Barnes
*Attorney*—Hans Berman

[57] ABSTRACT

A fertilizer and soil conditioner material is prepared from chicken manure, normally containing 80–90 percent water, by mixing the manure with a small amount of comminuted urea-formaldehyde resin foam sufficient to absorb the water, fermenting the manure while mixed with the foamed resin, and reducing the water content to not much more than 40 percent. The product is a practically odorless humus-like substance rich in microbial cells.

7 Claims, 5 Drawing Figures

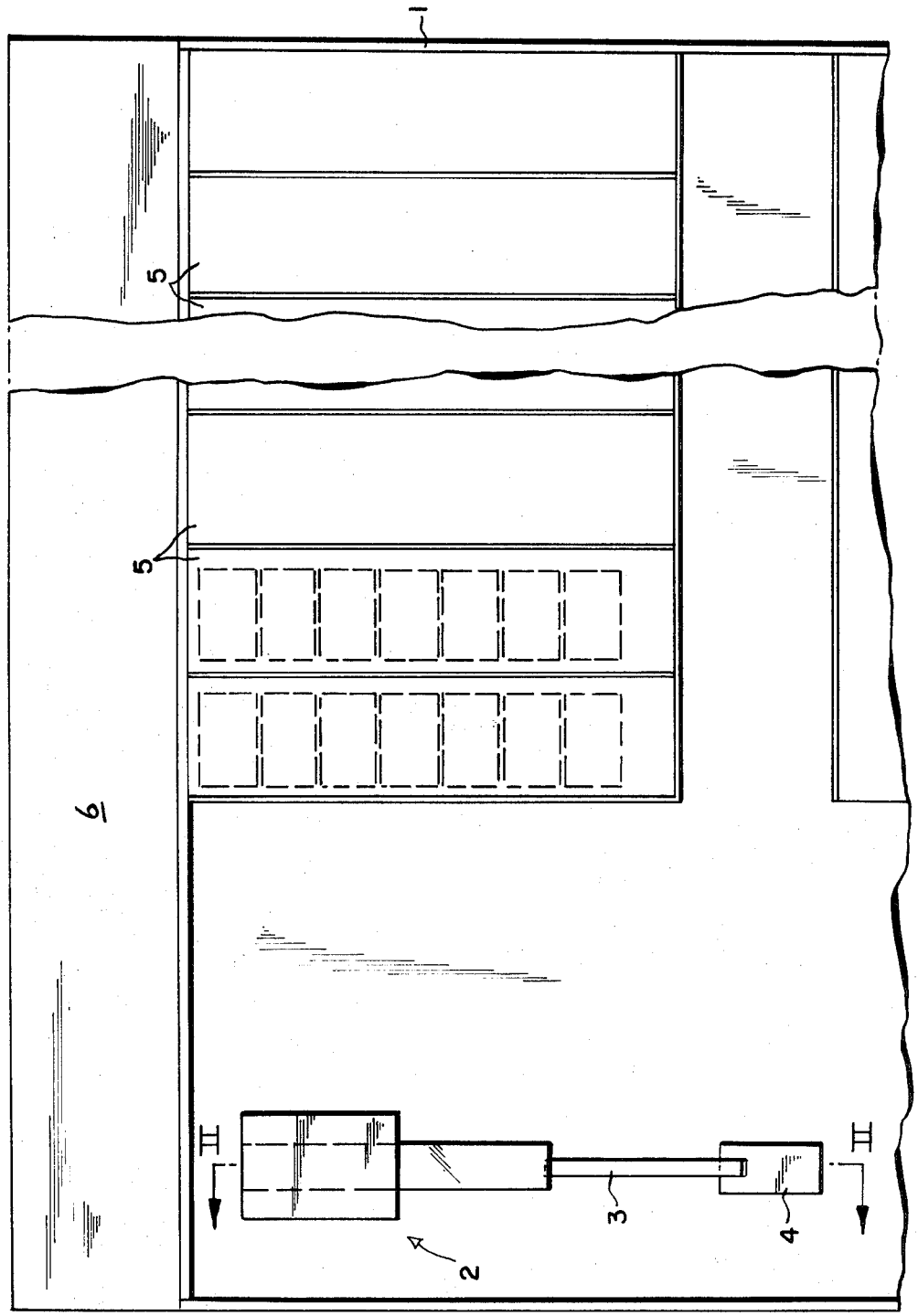

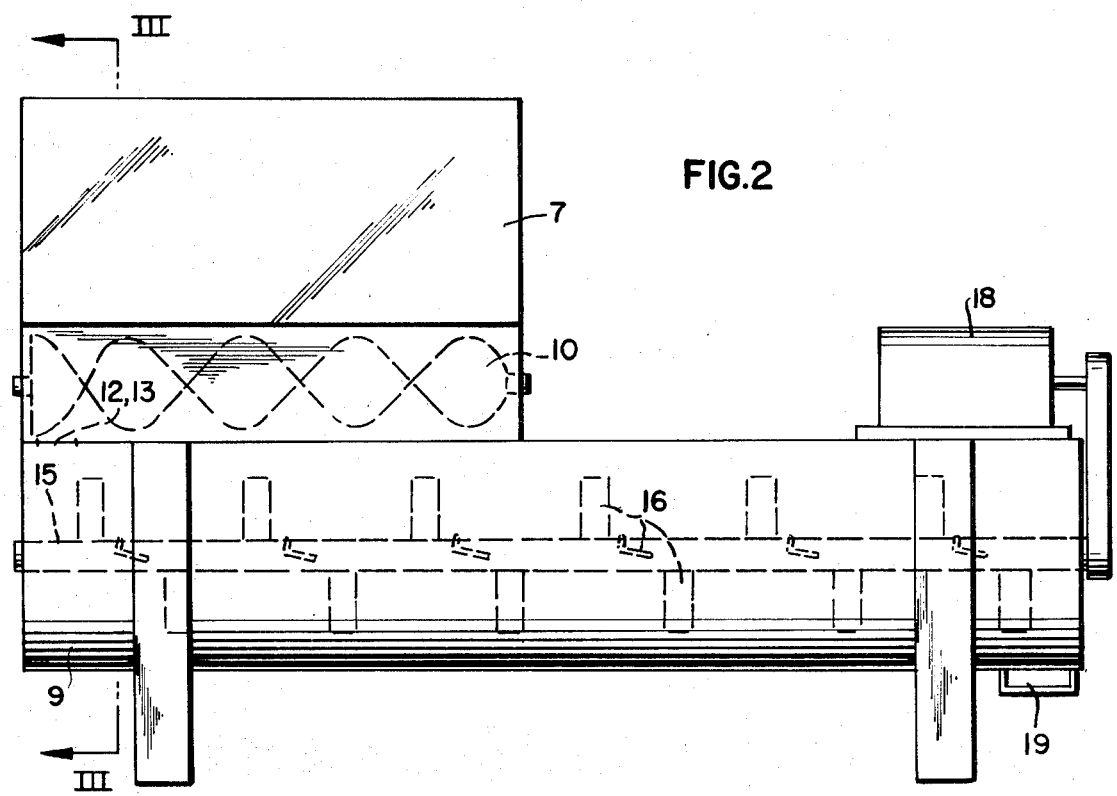
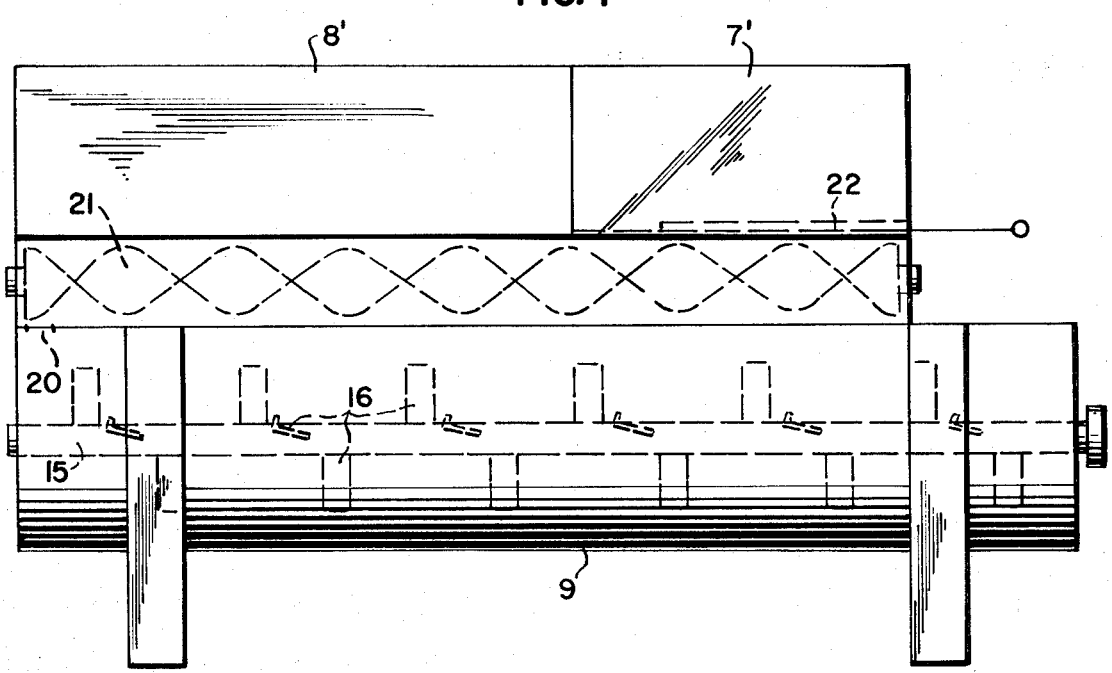

PATENTED FEB 27 1973 3,718,451

INVENTOR.
HEINZ BAUMANN
BY Kelman and Berman

AGENTS

METHOD OF MAKING FERTILIZER FROM CHICKEN MANURE

This application is a continuation of the copending application Ser. No. 831,105, filed June 6, 1969, and now abandoned.

This invention relates to fertilizers and soil conditioners, and particularly to a fertilizer based on chicken manure and to a method of preparing the same.

Chicken manure contains 80 to 90 per cent water, when fresh, and becomes extremely malodorous shortly after excretion. Raw chicken manure is not normally useful as a fertilizer, and various methods have been proposed for converting the manure to a product which can be handled conveniently and can be transported overland in a simple manner without creating a nuisance.

Peat moss has been mixed with the chicken manure heretofore, and the mixture has been permitted to ferment in order to reduce or remove the characteristic manure odor (German Pat. No. 1,017,629). The finished product is very bulky, and bulkier than the peat moss originally employed. Its water content is relatively high, and its nutrient concentration is low, the peat moss being practically devoid of assimilable plant nutrients. Approximately one pound of peat moss is required for the conversion of two pounds of fresh chicken manure. The known product thus is mainly a temporary soil conditioner like peat moss itself, and only marginally useful as a fertilizer. Its application in agriculture is very limited, and only a minor fraction of the total chicken manure produced is converted to a useful product by mixing with peat moss.

It has now been found that a fertilizer and soil conditioner rich in nutrients, whose dry matter mainly consist of fermented chicken manure solids, can be produced by mixing the fresh, water-bearing manure with the small amount of urea-formaldehyde resin foam required to absorb most of the water content of the manure, holding the mixture at a temperature above 15°C, and below 100°C, under aerobic conditions for a time sufficient to permit fermentation of the manure until the mixture is practically free of manure odor, and drying the mixture to a water content of not substantially more than 40 percent if it is desired to ship it over substantial distances.

The product so obtained has a yellowish-brown color, is practically odorless, and has the consistency of pulverized, moist humus. It consists essentially of not much more than 40 percent water, of particulate foamed urea-formaldehyde resin, fermented chicken manure solids, and microbial cells, the chicken manure solids and the cells being predominantly received in the voids of the foamed resin which amounts to not more than 5 percent, by weight, and may amount to as little as one per cent of the material on a dry basis. The water is practically uniformly distributed in the material.

Other features, additional objects and many of the attendant advantages of this invention will readily become apparent from the following detailed description partly relating to the attached drawing which illustrates apparatus suitable for performing the method, and in which:

FIG. 1 is a plan view of a plant for making the fertilizer of the invention from chicken manure;

FIG. 2 shows a portion of the plant of FIG. 1 in side-elevational section on the line II—II;

FIG. 4 shows a modification of the apparatus of FIGS. 1 to 3 in side elevational section.

Figure 3:
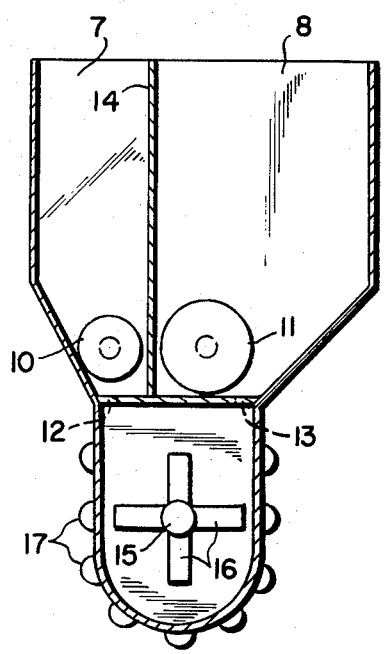
FIG. 3 illustrates the apparatus of FIG. 2 in front elevational section on the line III—III.

Referring now to the drawing in detail and initially to FIG. 1, there is seen a shed 1 in which a mixer 2 is installed at the head of a belt conveyor 3 leading to a pallet 4. Most of the shed 1 is occupied by normally closed chambers 5 equipped with non-illustrated blowers and heaters and dimensioned for storage of stacked pallets 4. The overhanging roof of the shed 1 protects a wide platform 6 extending over the full length of the shed, and otherwise open to the atmosphere.

The mixer 2, better seen in FIGS. 2 and 3, is equipped with horizontally elongated bins 7,8 for manure and plastic foam respectively. The bins are mounted atop an elongated mixing chamber 9 having a cylindrically rounded bottom and are separated by a partition 14. The contents of the bins 7,8 are transferred to the mixing chamber 9 by screw feeders 10,11 near the bottom of each bin which shift the material in the bins to discharge openings 12,13.

A shaft 15 extends longitudinally through the mixing chamber 9 and carries bars or hammers 16 which are axially and circumferentially offset on the shaft and are inclined relative to corresponding radii on the axis of the shaft 15 at angles of 5°–10°. When the feeders 10,11 are driven by non-illustrated motors through conventional multiple-speed transmissions, manure and plastic foam are fed to the chamber 9 at a desired ratio, and are intimately mixed and further comminuted by the hammers 16, when the shaft 15 is rotated at high speed by a motor 18.

External coils 17 on the mixing chamber 9 permit the mixture of manure and plastic foam to be brought to a desired temperature, usually 15° to 30°, before it is discharged from the mixing chamber 9 through an opening 19 at one end of the chamber which projects beyond the bins 7,8. The discharged mixture is transferred by the conveyor 3 to non-illustrated perforated boxes on pallets 4, and the pallets carrying the filled boxes are transferred to the chamber 5 by a non-illustrated fork lift.

If so desired, the afore-described apparatus may be modified in the manner illustrated in FIG. 4, in which the bins 7',8' are juxtaposed in the direction of the axis of the shaft 15 and are discharged by means of a common screw feeder 21. The feeder first receives manure from the bin 7' through a bottom opening of the bin whose size may be controlled by a slide valve 22, and thereafter receives plastic foam from the bin 8'. The still rather inhomogeneous mixture produced by the feeder 21 is dropped into the mixing chamber through an opening 20 near one axial end of the feeder, and is made homogeneous by the bars or hammers 16 on the shaft 15, as described above.

While it is entirely feasible to ferment the mixture discharged from the mixing chamber 9 in open boxes while the boxes are stored in the chambers 5, it has been found that the cost of converting chicken manure into fertilizer ready for shipment can be reduced significantly by transferring the raw mixture from the belt conveyor 3 directly into plastic bags. When thereafter sealed, the bags are ready for shipment.

Figure 5:
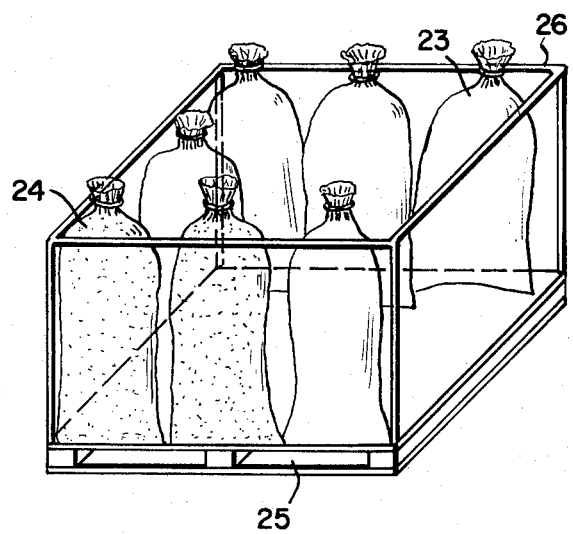
FIG. 5 is a perspective partial view of the plant of FIG. 1.

FIG. 5 shows empty plastic bags 23 and filled bags 24 held upright on a pallet 25 by a frame or raised rail 26, the upper ends of the empty bags being tied to the frame by cords, not shown, and the filled bags 24 standing upright on the pallet 25 and leaning against the frame 26 without being fastened thereto. While bags made from impervious sheet material may be employed, and adequate aeration may be had through the open tops of the bags during fermentation, it is preferred to use bags of perforated sheet material, the perforations being too small to be visible on the scale of FIG. 5. Such bags may be filled from the conveyor 3 and sealed at once. The moist material in the bags does not leak through the perforations.

Under typical conditions, the plant described above was operated as follows:

Urea-formaldehyde foam was prepared in an apparatus of the type disclosed by Bauer in U.S. Pat. No. 2,860,856 by mixing in a nozzle a 32 percent aqueous solution of a urea-formaldehyde precondensate (mole ratio 1:2) with an aqueous solution of 9 percent Nacconol SZA, a surfactant of the sodium alkylarylsulfonate type, and 1 percent phosphoric acid at a ratio of 10 parts resin solution and 9 parts acidified surfactant solution. The mixture was discharged from the nozzle by means of compressed air dispersed in the mixture at an initial pressure of 65 p.s.i. The stream of discharged foam was directed toward the platform 6, and mounds of urea-formaldehyde resin foam solidified quickly on the platform. They lost most of their moisture to the surrounding atmosphere during a storage period and the foam dried to approximate moisture equilibrium with the atmosphere had a bulk density of 40 grams per liter.

It was then shredded on a machine closely similar to a willow, and the shredded foam having a particle size of approximately 1–2 cm was transferred to the bin 8. Chicken manure was collected in the henhouse, liquefied by stirring with an ultrasonic agitator (Bosch), and pumped into the bin 7. The manure and shredded foam were mixed at a bulk ratio of 1:1 in the mixing chamber 9, and the volume of the mixture was not measurably greater than that of the manure alone. It still contained almost 80 percent water, but was a stiff sludge more similar to a solid than to a liquid.

The discharged sludge was transferred to open, perforated boxes having a capacity of about one ton, the boxes being filled to a depth of about 60 cm, or to plastic bags which were filled to a similar depth. When the plant was operated in summer, the mixing chamber was not heated, but in winter, the chamber was heated sufficiently to raise the temperature of the discharged sludge above 15°C, and preferably to 30°C.

The pallets carrying the mixture were stacked in the chambers 5 in superposed, single, horizontal rows, and fresh air at 15°–30°C was blown through the chambers to carry off gaseous products of the fermentation which started spontaneously, and to dissipate the fermentation heat so as not to raise the fermentation temperature much above 60°C. Moreover, much of the initial water content was lost to the air passing through the chambers 5. After approximately 6 days, the fermentation was completed as indicated by the temperature of the fermentation mixture which dropped to that of the supplied air, and the fertilizer material was ready for use.

When boxes were used during fermentation, the finished product which was humus-like in consistency, but yellowish brown in color, was transferred to shipping containers. When the fermentation was carried out in bags of imperforate material, the bags now were sealed for shipment. Perforated bags were sealed immediately after filling at the conveyor 4, and were transferred directly from the chambers 5 to trucks or railroad cars for dispatch to the intended place of application.

The material ready for shipment still contained about 40 percent water. On a dry basis, it had an ash content of 25.2 percent and contained 15.3 percent assimilable nitrogen, 5.3 phosphorus pentoxide, and 2.3 potassium oxide, also calcium oxide and magnesium oxide in amounts greater than the potassium oxide content. One gram of the material, on a dry basis, contained 211 millions of microorganism cells, and the microbial cells are an important plant nutrient.

The urea-formaldehyde resin foam, when freshly prepared under the conditions outlined above, has approximately 60 percent closed pores and 40 percent open pores. When shredded to a particle size of 1–2 cm, it has pores 95 percent of which are open to the atmosphere and available for absorbing the water in the manure together with most of the manure solids. Only a minor portion of the manure adheres to the outer surfaces of the foam shreds, and the manure is still predominantly contained in the pores of the foam when the intimately mixed and further comminuted material leaves the mixer 2. The bacterial cells which multiply during fermentation also accumulate to a large extent within the pores of the foam structure although the latter amounts only to a very small fraction of the ultimate product, typically 1 to 5 percent by weight on a dry basis depending on the initial ratio of manure to resin foam which may be varied accordingly.

The resin foam, when freshly made, contains small but significant amounts of free formaldehyde, and normally suppresses the growth of microorganisms deposited thereon by accidental contamination. The formaldehyde, however, is bound by the free ammonia present in the chicken manure and does not interfere with the growth and propagation of the microorganisms normally present in the fresh manure. It cannot contribute microorganisms alien to the manure. It has been found, however, that the fermentation can be accelerated by about 1 day if the number of microorganisms initially present is increased by introducing a small amount of the finished product into the mixing chamber 9 just ahead of the discharge opening 19, an admixture of as little as one part per 1000 being adequate.

The fertilizer and soil conditioner of the invention is somewhat tacky when containing 40% water, and therefore non-dusting. If it is desired to reduce the water content for lowering transportation charges, the material may be dried by exposure to the atmosphere or in any other desired and conventional manner to remove the water partly or entirely, care being taken to preserve the viability of the large amount of microorganisms present if at all possible.

The product of the invention is a highly effective fertilizer and soil conditioner for vegetable fields and for flowers. Unusually good results have been achieved in rose culture and are believed due to the high percentage of organic material in the product. Other plants, of course, similarly benefit from the manure solids and bacterial cell material present in the fertilizer of the invention. The urea-formaldehyde resin is not readily decomposed in the soil and loosens otherwise very heavy soil over extended periods of time. After the excess of formaldehyde is consumed by ammonia in the manure, the resin is inert to plant life.

While the invention has been described above with particular reference to chicken manure, other types of manure may be processed in the same manner to obtain similar products. At this time, however, chicken manure presents a serious disposal problem not present in manure derived from other animals.

What is claimed is:

1. A method of converting water-bearing manure to a substantially odorless composition suitable as a fertilizer which comprises:
    a. mixing said manure with a sufficient amount of foamed urea-formaldehyde resin to substantially absorb the water content of said manure,
        1. the amount of said resin being not substantially greater than five percent of the weight of the resulting mixture on a dry basis,
        2. said resin containing an amount of free formaldehyde sufficient to suppress the growth of microorganisms on said foamed resin prior to said mixing,
        3. said manure containing an amount of ammonia sufficient to bind said free formaldehyde and to permit growth of microorganisms present in the mixture obtained; and
    b. holding the mixture at a temperature above 15°C and below 100°C under aerobic conditions for a time sufficient to permit fermentation of said manure until the fermented mixture is substantially free of manure odor.

2. A method as set forth in claim 1, which further comprises drying the fermented mixture to a water content of not substantially more than 40 percent.

3. A method as set forth in claim 2, wherein said mixture is confined in a substantially closed chamber during said fermenting and said drying.

4. A method as set forth in claim 1, wherein said manure is chicken manure.

5. A method as set forth in claim 4, wherein the amount of said water in said chicken manure is approximately 80 to 90 percent.

6. A method as set forth in claim 4, wherein a small amount of said fermented mixture is added to another batch of a mixture of said chicken manure with an amount of foamed urea-formaldehyde resin not substantially more than five percent of the weight of said batch, on a dry basis, and said other batch having said fermented mixture added thereto is held at a temperature above 15°C and below 100°C under aerobic conditions until substantially free from manure odor.

7. A method as set forth in claim 6, wherein said small amount is approximately one part by weight of said fermented mixture per 1000 parts of said batch.

* * * * *